United States Patent Office
3,660,305
Patented May 2, 1972

3,660,305
FOAM CONTROL IN LIQUID HYDROCARBONS
Raymond J. Michalski, Riverdale, Ill., assignor to Nalco Chemical Company, Chicago, Ill.
No Drawing. Filed June 6, 1968, Ser. No. 734,881
Int. Cl. B01d 17/00
U.S. Cl. 252—321                            8 Claims

ABSTRACT OF THE DISCLOSURE

Improved defoaming compositions are afforded by combining acetylenic alcohols with known silicone antifoams. Preferred are acetylenic glycols which contain from 8 to 18 carbon atoms in an aliphatic grouping.

INTRODUCTION

Silicones are commonly used materials for preventing foaming in a wide variety of industrial fluids. These materials are particularly effective in preventing foaming in petroleum hydrocarbon liquids.

Silicones are expensive chemicals and are economically attractive only because they operate at extremely low dosage levels. In recent years newer type silicones have been developed which perform as defoamers for petroleum hydrocarbon liquids. Specifically certain fluorine-containing silicones have shown themselves to be useful defoaming chemicals when used to treat hydrocarbon liquids at elevated temperatures.

It has been the experience of the art, however, that the silicones, particularly high molecular weight silicone fluids such as the well-known polydimethylsiloxanes are not entirely satisfactory as antifoams since they are difficult to disperse in hydrocarbon systems. Frequently much of their effectiveness is lost due to plating out on the metal surfaces of the systems treated. Also much silicone is lost by improper formulating and diluting of these materials. Many attempts have been made to formulate conventional silicones into conveniently used antifoam formulations.

While silicones are effective for defoaming many organic liquids, in certain instances they do not seem to function well at low economical dosages when used at elevated temperatures. In such cases silicones become impractical to use as defoaming agents. Since many of the new high temperature effective silicones, such as fluoro silicones, are difficult to formulate and difficult to disperse in the systems to be treated, it would be advantageous if it would be possible to prepare such products in a form whereby they would remain active, and at the same time, be easily dispersed into hydrocarbon and other organic liquids.

Of benefit to the art would be the provision of an extender which would not only enable a variety of silicones to be used as defoamers but which would extend their activity. Of particular benefit to the art would be an extender for antifoam active silicones which would increase their efficiency and allow them to operate more effectively on a wider variety of fluids and under a wide range of temperatures. Such extenders should at the same time be commercially available and inexpensive whereby the total cost of antifoam treatment for a given system would be substantially reduced. Also such extenders would ideally allow the silicones to be readily dispersed into process systems such as petroleum hydrocarbon liquids. Based on the above, the following become the objects of the invention.

OBJECTS OF THE INVENTION

An object of the invention is to provide what may be termed an extender for silicone antifoams, whereby their effectiveness is improved over a variety of operating conditions.

Another object of the invention is to provide an extender or adjuvant for silicone antifoams whereby they would defoam systems which are incapable of being defoamed by such silicones at commercially practical dosages.

A further object of the invention is to provide improved silicone antifoam compositions which can be conveniently prepared from commercially available chemicals and as finished concentrates allow silicones to be effectively used to treat a variety of hydrocarbon systems, particularly those of the type commonly found in the processing of petroleum.

THE INVENTION

In accordance with the invention it has been found that an improved defoaming composition for organic liquids is afforded by combining 90–99.99% by weight of a silicone defoamer with from 0.01–10% by weight with a $C_3$–$C_{20}$ acetylenic alcohol. In preferred embodiment of the invention the amount of acetylenic alcohol used is within the range of 1–5% by weight based on the silicone used. The acetylenic alcohols are most suitably acetylenic glycols containing from 8 to 18 carbon atoms in an aliphatic grouping.

THE SILICONE DEFOAMERS

The silicones are well-known chemicals useful in defoaming a variety of industrial process fluids. They are particularly useful in defoaming hydrocarbon fluids of the type resulting from the refining of petroleum hydrocarbon liquids. The types of silicones that are useful in the practices of the invention are well-known and are described in the following U.S. patents, the disclosure of which is incorporated herein by reference:

| | |
|---|---|
| 2,357,007 | 2,570,719 |
| 2,416,503 | 2,589,317 |
| 2,416,504 | 2,643,240 |
| 2,464,231 | 2,702,793 |
| 2,488,449 | 2,724,698 |

In addition to using silicone of the types described in the above patents, it is also possible to use the new well-known fluoro silicones of the types described in U.S. Pats. 3,115,472 and 2,894,969.

While any of the silicones of the type disclosed in the above patents may be employed in the practice of this invention, certain silicones form a preferred class.

A careful study of the literature with respect to the chemistry of silicones useful in the defoaming of industrial systems, particularly hydrocarbon oils, reveals that all of the compounds are polymeric in nature, e.g. contain at least 2 silicon atoms. These polymers are further characterized as containing at least one organic grouping or radical connected either directly to a silicon atom, or to a silicon atom through an oxygen linkage. The first type is illustrated by the well-known poly dimethylsiloxanes. In the second category are the polymeric silicate esters exemplified by the polymerized ethyl silicates.

Preferred silicons useful in defoaming a wide variety of hydrocarbon oils are the poly dimethylsiloxanes which are formed by the condensation polymerization of dimethyldichloro silane under well-known reaction conditions. Such poly dimethylsiloxanes are available commercially and come in a wide variety of molecular weights. Preferred poly dimethylsiloxanes are sold commercially by Carbide & Carbon Corporation under the trade designation "L-45." These chemicals are poly dimethylsiloxanes having centistoke viscosities at 25° C. ranging between 7.0 up to 100,000. The higher molecular weight materials, those having viscosities in excess of 10,000 cps., are advantageous for use in defoaming hydrocarbon liquids in accordance with the teachings of this invention. A particularly useful material is the "L–45," poly dimethylsiloxane, having a centistoke viscosity of 60,000.

Another particularly useful group of chemicals used in the practices of the invention are the well-known fluoro silicone defoamers of the type described in the disclosures of U.S. 2,894,969, U.S. 2,961,425, U.S. 2,983,746, U.S. 3,002,951, U.S. 3,105,810 and U.S. 3,115,472. The preferred polymers have an F to Si ratio of from 2:1 to 1:2 and most preferably the ratio is 1:1.

Typical polymers used in the practice of this invention contain as a portion of their structure the units

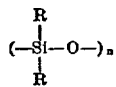

In the above formula R is an organic radical which contains at least 2 fluorine atoms attached to 1 carbon carbon atom, or it may be a radical exemplified by lower alkyl radicals of less than 4 carbon atoms. Also, it may be a phenyl group, a lower substituted phenyl radical, a lower alkoxy radical or hydrogen. It is, of course, understood that at least one occurrence of R should contain at least two fluorine atoms which are attached to one carbon atom. $n$ is an integer. These units should represent at least about 50% of the units of the polymer.

A particulary useful group of fluorosilicone polymers are those which contain at least 90% of the units which have the formula

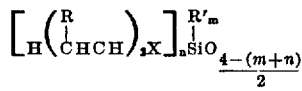

in which each R is a perfluoroalkyl radical of less than eleven carbon atoms, each R' is a monovalent aliphatic hydrocarbon radical of less than 4 carbon atoms, each $x$ has a value of from 1 to 3, each $n$ has a value of from 1 to 3, each $m$ has a value of from 0 to 2, and the sum of n+m is no greater than 3. The remaining siloxane units, if any, in the polysiloxane have the unit formula

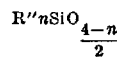

in which each R" is selected from the group consisting of hydrogen atoms, monovalent hydrocarbon radicals and halogenated monovalent hydrocarbon radicals and $n$ is as above defined.

As stated above, R can be any perfluoroalkyl radical containing from one to ten carbon atoms, such as $CF_3$—, $C_2F_5$—, $C_3F_7$—, and so on up to $C_{10}F_{21}$—. These perfluoroalkyl radicals can be either straight or branch chained radicals. R' can be the methyl, ethyl, propyl, vinyl or allyl radicals, preferably methyl. R" can be hydrogen or any monovalent hydrocarbon radical, such as alkyl radicals, e.g., methyl, ethyl, tert-butyl, 2-ethylhexyl, octadecyl and myricyl; cycloalkyl radicals, e.g., cyclopentyl and cyclohexyl; alkenyl radicals, e.g., vinyl, allyl and butadienyl; cycloalkenyl radicals, e.g., 3,4-cyclopentenyl and 2,3-cyclohexenyl; aryl radicals, e.g., phenyl, xenyl and naphthyl; alkaryl radicals, e.g., tolyl and xylyl and aralkyl radicals, e.g., benzyl and phenylethyl. R" can also be any monovalent halogenated hydrocarbon radical, for instance, halogenoalkyl radicals such as monochloromethyl, 2,2-dibromoethyl, 5,5,5-trifluoro-2-(trifluoromethyl)amyl and 5,10,15-tridopentadecyl, halogenocycloalkyl radicals such as 1,2-dibromocyclopentyl, 2,3,3-trifluoro-2-chlorocyclobutyl and perchlorocyclohexyl, halogenoalkenyl radicals such as 2-chlorovinyl, 3,3-dibromoallyl and 3-iodobutadienyl, halogenocycloalkenyl radicals such as 3-fluoro-2,3-cyclopentenyl and 3-chloro-4-bromo-3,4-cyclohexenyl, halogenoaryl radicals such as 2,4,6-trifluorophenyl, 4,4'-dibromoxenyl and B-chloronaphthyl, halogenoalkaryl radicals such as a,a,a-trifluorotolyl and 2,4-dibromotolyl, and halogenoaralkyl radicals such as (perfluorophenyl)-ethyl, 3,5-diiodobenzyl and a-bromobenzyl.

The valve of $n$ can range from 1 to 3 while the value of $m$ ranges from 0 to 2, but the sum of $m+n$ cannot be greater than 3. In other words, the fluorinated organopolysiloxane employed in this invention can have any of the following siloxane units where Z is the

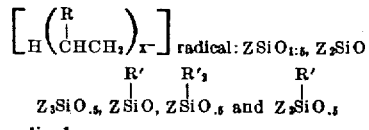

In the radical

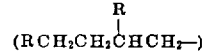

$x$ can have a value of from 1 to 3. When $x$ is 1, the radical is ($RCH_2CH_2$—) shown in the U.S. Pat. No. 2,979,519. When $x$ is more than 1, the radicals are

and

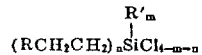

shown in U.S. Pat. No. 2,894,969. The teachings of these applications are herein incorporated by reference.

The compositions employed in this invention in which x—1 can be prepared starting with the chlorosilanes of the formula

These, in turn, can be prepared by the reaction of an alkene of the formula $RCH=CH_2$ with a chlorosilane containing from 1 to 3 silicon-bonded hydrogen atoms in the presence of a peroxide or platinum catalyst at temperatures of from 150° to 300° C.

The olefins can be prepared starting with a perfluoro acid of the formula RCOOH, where R is as above defined, esterifying this acid with ethanol and thereafter reacting the ethyl ester with a mixture of methyl Grignard and isopropyl Grignard to give an alcohol of the formula $$CH_3$$
$$R\overset{|}{C}HOH$$

This secondary alcohol is then dehydrated by heating with $P_2O_5$ to give the olefin $RCH=CH_2$.

The above method is preferred where the R' groups on the silicon are saturated aliphatic groups. In those cases, however, where R' is an unsaturated aliphatic radical it is preferred to prepare these fluorocarbosiloxanes by the Grignard method. This can be done by reacting the olefins $RCH=CH$ with HBr to give the brominated compounds $RCH_2CH_2Br$ and thereafter preparing a Grignard reagent of these materials which can be then reacted with a chlorosilane of the formula $R'_mSiCl_{4-m}$.

The compositions of this invention in which $x$ is 2 or 3 can be prepared by heating a fluoroalkene of the formula $RCH=CH_2$, where R is as above defined, in the presence of any free radical generator capable of activating the olefin, such as peroxides, to form telomers of the formula

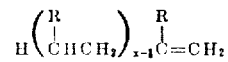

These are subsequently added to the silane of the formula $R'_mSiH_nCl_{4-m-n}$ by olefinic addition.

An alternative method is via the Grignard method. This method involves preparing compounds of the formula

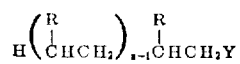

where Y is halogen, forming a Grignard reagent therefrom and reacting it with a silane of the formula $$R'_mSiCl_{4-m}$$

This method is preferred when it is desired to put two different fluorinated radicals on the silicon and/or when R' is an unsaturated aliphatic radical.

The siloxanes are best prepared by hydrolyzing either singly or in any mixture the above chlorosilanes, preferably dichlorosilanes with or without monochlorosilanes. If desired, the hydrolysis can be carried out in the presence of solvents such as ethers, toluene, xylene or other hydrocarbons.

The hydrolyzates of the dichlorosilanes can be further polymerized employing alkaline and acidic catalysts according to standard practice.

Another method of preparing the siloxane copolymers is by catalytic copolymerization using mixed siloxanes.

It is to be understood that the siloxanes employed herein can be either homopolymeric materials or copolymeric materials containing two or more different types of siloxane units and further that the organic radicals attached to any one silicon atom can be the same or different as long as they are within the scope of the claims.

Copolymers of the above-defined fluorinated siloxanes can contain up to 10 mol percent siloxane units of the formula $$R''_nSiO_{\frac{4-n}{2}}$$

in which R'' and n are as above defined, with out the effect of the fluorinated unit being appreciably diminished.

These copolymers can be prepared by cohydrolysis of the corresponding chlorosilanes or by the alkaline copolymerization of the corresponding cyclic trisiloxanes.

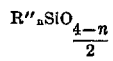

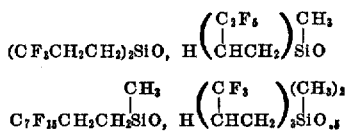

and copolymers such as a copolymer of 50 mol percent

and 50 mol percent

a copolymer of 95 mol percent

and 5 mol percent diphenylsiloxane, a copolymer of 95 mol percent

4.75 mol percent phenylmethylsiloxane and .25 mol percent methylvinylsiloxane and a copolymer of 90 mol percent

2 mol percent

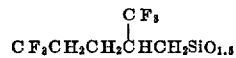

and 8 mol percent dimethylsiloxane.

The molecular size and form of any of the siloxanes employed in this invention is not critical. Thus, such siloxanes can vary from low to high molecular weight fluids, gums and resins. A particularly useful group of fluorosilicones are low molecular weight polymers based on fluorosilicone derivatives of the type

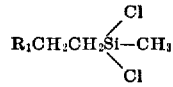

where R is a fluorocarbon group such as $CF_3$, $C_3F_7$, etc. Typical properties are shown in Table I.

TABLE I.—TYPICAL PROPERTIES

| | Viscosity grade, cs. | | |
|---|---|---|---|
| | 250 | 1,000 | 10,000 |
| Color | (¹) | (¹) | (¹) |
| Viscosity, cs. at 25° C | 250 | 1,000 | 10,000 |
| Viscosity, cs. at— | | | |
| −18° C | 3,900 | 22,000 | 440,000 |
| 37° C | 140 | 510 | 5,400 |
| 100° C | 24 | 74 | 690 |
| 205° C | 5 | 11.5 | 80 |
| Specific gravity at 25° C | 1.24 | 1.28 | 1.30 |
| Freeze point, ° C | −51 | −40 | −32 |
| Flash point, open cup, ° C | 225 | 275 | 275 |
| Fire point, ° C | 275 | >325 | >325 |
| Volatility (wt. percent): | | | |
| 4 hr. at 200° C | 4.1 | 1.5 | 1.5 |
| 48 hr. at 200° C | 13.5 | 3.1 | 3.0 |
| 120 hr. at 200° C | 20.0 | 5.0 | 4.9 |
| 240 hr. at 200° C | 25.0 | 8.0 | 6.0 |
| Gel time, hr. at 200° C | 350 | 350 | 350 |
| Acid number | Trace | Trace | Trace |
| Surface tension (dynes per cm.) | 25.7 | 26.1 | 28.7 |

¹ Water white to straw.

In some instances, it is desirable to use a blend of silicones to achieve special effects and in certain instances, improve defoaming characteristics. A useful material for blending with poly dimethylsiloxanes or the fluorosilicones is a special silicone which contains boron. In general, such products are derived from the action of a boron compound in a polyethyl silicate.

These products have the following general formula:

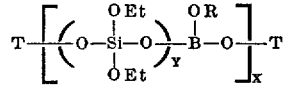

where X is an integer ranging from 10 to 200, Y is an integer ranging from 4 to 15 and R is an organic alkyl radical ranging from 1 to 18 carbon atoms. T may be either R— or

The polymer itself is best described as a polyoxyethylsilicoxyalkylboroxy oligomer having the above repeating units.

The boron compound used to form the compositions by reaction with polyethyl silicate may be chosen from among trialkyl borates or boric anhydride. The trialkyl borate compounds may have similar or different radicals attached to the boron atom. It is preferred however that each of the three radicals attached to the boron be identical. Typical trialkyl borates useful as reactants include trimethyl borate, triethyl borate, triisopropyl borate, tripropyl borate, tributyl borate, trioctyl borate, tridodecyl borate, etc. The most preferred boron reactants are boric anhydride itself and triethyl borate. When boric anhydride is employed as a condensing agent with the polyethyl silicate, during the reaction ethanol is given off. The ethanol in turn reacts with the OH radical attached to the boron atom to produce the corresponding —B—OEt grouping either prior to reaction with the polyethyl silicate polymer and/or after the boron atom has already been made part of the polymer itself.

The other reactant used is a polyethyl silicate. Preferred materials are those having an average molecular weight ranging from 300 to 2000 and more preferably from 400 to 1500. These polysilicate materials are generally derived from controlled hydrolysis of silicon tetrahalides and particularly silicon tetrachloride in aqueous-ethanolic solutions. A mixture of polymeric materials is formed, but the predominant species has the following general formula:

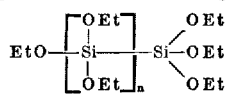

wherein n is an integer ranging from about 4 to about 15 and Et represents the $C_2H_5$ group. In addition other lower molecular weight polysiloxanes may be present which may be termed, for convenience, hydrolyzate condensation products of the starting silicon tetrahalide reactants. These hydrolyzate condensation products generally contain terminal hydroxyl groups. More preferred polyethyl silicate mixtures therefore have at least 1% of their weight composed of free reactive hydroxyl groups and most preferably at least 2%. A typical ethyl silicate polymer has 2–3% of its molecular weight composed of hydroxyls. These reactive hydroxyl containing compounds are belived to act as "bridge" reactants between the boron and polyethyl silicate compositions represented by the above formula. In effect, these low molecular weight polysiloxanes which contain reactive hydroxyl groups promote further polymerization as well as reaction of the boron with the polyethyl silicate polymers.

Likewise, these above polysilicate materials may be defined solely in terms of their available silica content expressed as $SiO_2$. In materials of this type, as the extent of polymerization increases, silica content, expressed as SiO likewise proportionally increases. Preferred polyethyl silicates have an available silica content, expressed as SiO, ranging from 35% by weight of the overall molecule weight to about 55% by weight. More preferred materials have SiO contents within a range of 35–45%.

Most preferably, the $SiO_2$ content of the polyethyl silicate reactant ranges from about 38% to about 42% by weight. As a comparison a pure monomeric tetraortho silicate ester has a silica content ($SiO_2$) of approximately 28% by weight. Thus, by the term "polyethyl silicate" is meant a composition mixture characterized by the above distinguishing physical and chemical properties which is usually formed by controled ethanolic hydrolysis of silicon tetrahalide or similar monomeric derivatives.

A preferred starting polyethyl silicate reactant is sold under the trademark, "Ethyl Silicate 40." This compound is a mixture of ethylpolysilicate having about 40% available silica expressed as $SiO_2$ and is synthesized from the controlled hydrolysis of tetraethylortho silicate or tetrachlorosilicon. This polyethyl silicate is generally described as a mixed polymer of ethyl silicate with an average of 5 silicon atoms per molecule.

One specific source of this material has a specific gravity at 20° C. of 1.0558, a freezing point of —90° C., a viscosity at 20° C. of 3.9 cps. and a refractive index at 20° C. of 1.3965. This particular polymeric substance was derived from the controlled hydrolysis of silicon tetrachloride in 95% ethanol and 5% water.

PREPARATION OF THE COMPOSITIONS

The compositions are prepared by heating one or more of the above described boron compounds and the polyethyl silicate reactant together at temperatures preferably from about 70° C. to about 250° C. The time of heating may be varied over a wide range, but preferably is carried out in from about 2 to about 12 hours. The most preferred products are prepared by heating from 5 to about 10 hours. Vacuum may also be employed during the heating step to measured levels as low as 5 mm. of mercury. Excellent products have been prepared by heating the two reactants at pot temperatures ranging from 80 to 200° C. over a period of 6–10 hours.

During the reaction the lower molecular weight silicate polymers having free reactive hydroxyl groups which help to induce molecule reactivity, condense with the boron molecule to "build" in boron atoms into the final polymeric structure via an —O—B—O— bonding. As the reaction proceeds, alcohol such as ethanol is removed along with low boiling polyethylsilicate fractions. The final product then is a 100% active, slightly viscous liquid, free of inactive recrement or diluents.

Preferred products may be prepared by reacting from about 1.0% to about 20% by weight of the boron and from about 80% to about 99% by weight of the polyethyl silicate reactant, both percentages being based on total reaction mass weight. More preferred reaction masses are composed of 1–10% by weight of boron and 90–99% by weight of the prepolymerized polyethyl silicate.

It has also been discovered that the reaction between the boron compound and polyethyl silicate may be made materially more rapid if it is run in the presence of a finely divided silica. The silica, which is believed to act in the nature of a catalyst, should generally have a large surface area of at least 20 m.²/g. and usually in excess of 120 m.²/g. The particle surface area may be run as high as 500–600 m.²/g. When the finely divided, high surface area silica is present, the reaction is generally speeded up to about 15–75% over those runs involving no silica.

The silica catalyst may be chosen from a variety of well-known forms of silica. For example, a precipitated silica may be used, as for example, one prepared by peptizing a colloidal silica sol. Other suitable silica reactants are silica aerogels. These are silicas which are colloidal in nature and are generally prepared by replacing the water of a silica hydrogel with a low boiling organic liquid, miscible in water, followed by heating the resultant product in an autoclave above the critical temperature of the liquid. A particularly preferred type of silica reactant is a fume silica. This is a silica capable of being put into colloidal form, which is obtained by burning silicon tetrachloride and collecting the resulting silica smoke. A similar product may be obtained by burning a tetraorthosilicate at extremely high temperature.

One specific silica substance having found particular utility in increasing the reactivity of the boron and polyethol silicate is a commercial product sold under the trade name "Cab-O-Sil." This type of silica is almost substantially chemically pure silica, expressed in terms of $SiO_2$ and is made up of extremely fine, well-defined particles. This material is produced by a vapor phase hydrolysis process of heating silicone tetrachloride in a furnace at 1100° C. The individual separate particles of silicone dioxide, which are formed almost instantly, are collected in a cyclone. Table II below gives specific chemical and physical characteristics of this material.

TABLE II

Silica content (moisture-free basis)—99.0 to 99.7%
Free moisture (105° C.)—0.2 to 1.5%
Ignition loss at 1000° C. (excluding moisture)—0.2 to 1.0%
CaO, MgO, $Na_2O$—0.0%
$Fe_2O_3+Al_2O_3$—0.01%
Particle size range—0.015 to .020 micron
Surface area (nitrogen absorption)—175 to 200 sq. meter/gram
Specific gravity—2.1
Color—white
Refractive index—1.55
pH (4% aqueous dispersion—3.5 to 4.2
Oil absorption (Gardner Method)—150 lbs. oil/100 lbs. pigment
Bulking value—0.057 gal./lb.

When finely divided silica is used to increase reactivity of boron and polyethyl silicate, generally from about 0.1% to about 10.0% by weight of silica is employed based on total reaction mass weight. More preferably, 0.1–5% by weight of silica is used. It is understood, of course, that the products may nevertheless be synthesized without employment of silica whose use is solely that of speeding up the reaction time.

The following examples state typical modes of preparation representative compositions.

Example I

A reactor was charged with 94 pounds of "Ethyl Silicate 40," 3.0 pounds of boric anhydride, and 3.0 pounds of "Cab-O-Sil." The mixture was heated with stirring, and ethanol began to distill over at 79° C. When alcohol no longer distilled over, the temperature of the reaction mixture was increased to 200° C. At this time, the vapor temperature rose to 120–130° C. but was not allowed to exceed 130° C. The aforementioned pot temperature was maintained until a total reaction time of approximately 6½ hours was reached. The product, falling within the above listed structural formula where R is ethyl, was then cooled and drummed.

Example II

In this example the "Cab-O-Sil" silica catalyst was omitted. The reaction was run exactly as set out in Example I above, but the reaction time to achieve the suitable product was approximately 9½ hours in this instance. As in Example I, the product fell within the general structural formula with R being ethyl.

When such boron containing compositions are used in combination with polydimethylsiloxane or other silicones, they are advantageously employed to provide a silicone to boron containing silicone weight ratio within the range of 5:1 to 1:5.

THE ACETYLENIC ALCOHOLS

The acetylenic alcohols used in the practice of the invention may be considered as extenders for the silicone defoamers and to that end tend to provide compositions which are low cost and yet are far more effective than the active silicone ingredient with which they are combined. The acetylenic alcohols are well-known chemicals of commerce and are prepared commercially by reacting acetylene with a carbonyl compound which may be either an aldehyde or a ketone. The acetylenic alcohols produced by this reaction are a blend of monohydric alcohols and glycols.

In the practices of this invention any of the acetylenic alcohols containing from 3 to 20 carbon atoms may be used although it is desirable to use acetylenic glycols containing from 8 to 18 carbon atoms in an aliphatic grouping. A preferred acetylenic glycol is 2,4,7,9-tetramethyl-5-decyne-4,7-diol.

Thus the preferred acetylenic alcohols are acetylenic glycols which contain from 8 to 18 carbon atoms with those carbon atoms being in the form of aliphatic groupings. These latter classes of materials are particularly effective when combined with silicones to defoam hydrocarbon liquids arising from the refining and treating of petroleum.

The acetylenic monohydric alcohols have the formula:

$$HC \equiv CCRR'OH$$

and the dihydric alcohols have the formula:

$$HORR'C \equiv CCRR'OH$$

Where R is an aliphatic hydrocarbon group and R' is either H, or an aliphatic hydrocarbon group.

The acetylenic alcohols allow the silicones to be dispersed into a large number of organic liquids without the silicone being plated out onto surfaces of the system or lost due to improper dispersion. It is believed the dispersions of the silicons produced by the acetylenic alcohols allow the silicone to be placed into the organic liquids at almost molecular proportions, thereby maximizing their effectiveness as antifoam agents.

A generic composition of the invention has the following formula:

| Ingredients: | Percent by wt. |
|---|---|
| Silicone | 90–99.99 |
| Acetylenic alcohol | 0.01–10 |

A more preferred formula is:

| Ingredients: | Percent by wt. |
|---|---|
| Silicone | 95–99 |
| Acetylenic glycol | 1–5 |

To improve the handling, storage and shipping characteristics of the compositions, it is frequently desirable that they be blended with from 20%–90% by weight of organic solvent or carrier such as an aromatic solvent typified by such compounds as benzene, xylene and toluene. Also such materials as mineral spirits and various petroleum fractions, e.g. naphthas, kerosine, fuel oils and the like may also be used. Such products provide formulated compositions which are stable and easily fed to industrial systems. The preferred products of this type are in the form of solutions of the silicones and the acetylenic alcohol in the organic solvent.

To illustrate such a product the following formula is presented below as Composition I.

COMPOSITION I

| Ingredients: | Percent by wt. |
|---|---|
| Poly dimethylsiloxane (60,000 centistokes) | 25 |
| Composition of Example II | 10 |
| 2,4,7,9-tetra methyl-5-decyne-4,7-diol | 4 |
| Xylene | 61 |

The above formula is extremely beneficial in defoaming petroleum hydrocarbon liquids as they are processed in refining operations. To illustrate the fact that the acetylenic alcohols improve the activity of the silicone, the following are presented by way of example.

EVALUATION OF THE INVENTION

This particular field test took place in a refinery which used a variety of crude oil sources. The experience was that when certain Venezuelan crudes were used, extreme foaming occurred in a pre-flash drum which was located after a crude electrical desalting unit. When foaming occurred it was customary to use a poly dimethylsilicone oil dispersed at about 3% by weight concentration into a No. 2 fuel oil. This material was fed to provide about 6 p.p.m. of silicone into the pre-flash drum. When a foaming Venezuelan crude was run in these units, the silicone was completely ineffective in preventing the foaming. In another series of tests, a fluorosilicone (Table I, 1,000 cs.) was used in a similar fashion, and was fed at 4 p.p.m. While some defoaming was effectuated it was not completely satisfactory from an operational standpoint of view. After the poly dimethylsiloxane and the fluorosilicones described above had failed, Composition I was used to provide 2 p.p.m. of the total composition. Foaming in the pre-flash drum when Venezuelan crudes were run was completely abated.

The above illustrates the unique effectiveness of the compositions of the invention. It shows the acetylenic alcohols definitely improve the defoaming abilities of conventional silicones.

Having thus described my invention, it is claimed as follows:

1. A method of preventing foaming in hydrocarbon liquids which consists of treating said liquids with an effective amount of a defoaming composition consisting essentially of the active ingredients:

| Ingredients: | Percent by wt. |
|---|---|
| Silicone (cs. 250–500,000) | 90–99.99 |
| Acetylenic alcohol | 0.01–10 | said acetylenic alcohols being selected from the group consisting of alcohols having the formulae:

$$HC \equiv CCRR'OH$$

and $$HORR'C \equiv CCRR'OH$$

where R is an aliphatic hydrocarbon group having from 3 to 20 carbon atoms in chain length and R' is selected from the group consisting of hydrogen and aliphatic hydrocarbons having from 3 to 20 carbon atoms in chain length.

2. The method of claim 1 wherein the acetylenic alcohol is an acetylenic glycol which contains from 3–20 carbon atoms.

3. The method of claim 1 wherein the acetylenic alcohol is an acetylenic glycol which contains from 8 to 18 carbon atoms in an aliphatic grouping.

4. A method of defoaming petroleum hydrocarbon liquids which comprises treating said liquid with a defoaming composition consisting essentially of:

| Ingredients: | Percent by wt. |
|---|---|
| Poly dimethylsiloxane | 90–99.99 |
| Acetylenic glycol which contains from 8–18 carbon atoms in an aliphatic grouping | 0.01–10 |

5. The method according to claim 4 wherein the acetylenic glycol is 2,4,7,9-tetramethyl-5-decyne-4,7-diol.

6. The method according to claim 4 wherein the poly dimethylsiloxane has a centistoke viscosity of 60,000 at 25° C.

7. The method according to claim 1 wherein the defoaming composition further contains from 20 to 90% by weight of an aromatic hydrocarbon solvent.

8. The method of claim 4 wherein the siloxane is a blend of:
(a) a poly dimethylsiloxane, and
(b) a boron containing siloxane polymer having the structural formula:

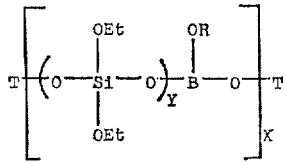

where Y is an integer ranging from 4 to 15, X is an integer ranging from 10 to 200, R is an organic alkyl radical containing from 1 to 18 carbon atoms, and T is from the group consisting of: R— and

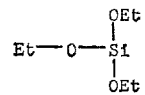

with the ratio of (a) to (b) being within the range of 5:1 to 1:5.

References Cited

UNITED STATES PATENTS

| 2,997,447 | 8/1961 | Russell et al. | 260—635 Y |
| 3,076,768 | 2/1963 | Boylan | 252—358 |

OTHER REFERENCES

Bazant Chemistry of Organo Silicon Compounds, Academic Press, N.Y. (1965), pp. 39–40.

Chemical Abstracts, vol. 53, col. 10812(e), 1959.

Ross, "Chemical Antifoaming Agents," Chemical Industries, May (1949), pp. 757-9.

Freeman, Silicones (1963), London, Iliffe Ltd., pp. 41–2.

JOHN D. WELSH, Primary Examiner

U.S. Cl. X.R.
252—358